(12) United States Patent
Jiang et al.

(10) Patent No.: US 11,490,258 B2
(45) Date of Patent: Nov. 1, 2022

(54) METHOD AND APPARATUS FOR SECURING A WI-FI LINK IN A WIRELESS COMMUNICATION SYSTEM

(71) Applicant: NXP USA, Inc., Austin, TX (US)

(72) Inventors: Jinjing Jiang, Austin, TX (US);
Manish Kumar, Austin, TX (US);
Huiling Lou, Austin, TX (US)

(73) Assignee: NXP USA, Inc., Austin, TX (US)

( * ) Notice: Subject to any disclaimer, the term of this patent is extended or adjusted under 35 U.S.C. 154(b) by 293 days.

(21) Appl. No.: 16/850,969

(22) Filed: Apr. 16, 2020

(65) Prior Publication Data

US 2020/0336898 A1 Oct. 22, 2020

Related U.S. Application Data

(60) Provisional application No. 62/836,539, filed on Apr. 19, 2019.

(51) Int. Cl.
*H04L 29/06* (2006.01)
*H04W 12/50* (2021.01)
*H04W 12/06* (2021.01)
*H04W 4/80* (2018.01)
*H04W 84/12* (2009.01)

(52) U.S. Cl.
CPC ............ *H04W 12/50* (2021.01); *H04W 4/80* (2018.02); *H04W 12/06* (2013.01); *H04W 84/12* (2013.01)

(58) Field of Classification Search
CPC ....... H04W 12/50; H04W 4/80; H04W 12/06; H04W 84/12
See application file for complete search history.

(56) References Cited

U.S. PATENT DOCUMENTS

2019/0306710 A1* 10/2019 Cammarota ...... H04W 12/0431
2020/0162904 A1* 5/2020 Jiang .................. H04L 63/1475

OTHER PUBLICATIONS

WiFi Alliance Multi-AP Specification Version 2.0 (Year: 2019).*
Wi-Fi Alliance, "Device Provisioning Protocol Specification," Version 1.0, Apr. 9, 2018; 124 pages.
Wi-Fi Alliance, "Multi-AP Specification," Verision 1.0, May 18, 2018; 66 pages.
Wi-Fi Alliance, "Wi-Fi Simple Configuration Technical Specification," Version 2.0.7, Dec. 9, 2019; 154 pages.

\* cited by examiner

*Primary Examiner* — Shawnchoy Rahman

(57) ABSTRACT

A method for securing a Wi-Fi link in a wireless communication system includes configuring an existing agent with a controller, wherein the existing agent is configured as a first Basic Service Set (BSS). An enrollee agent is onboarded with a Push Button Configuration (PBC) method to establish an 1905 layer security between the existing agent and the enrollee agent. The enrollee agent is configured with the controller, including the controller transmitting a Device Provisioning Protocol (DPP) Bootstrapping Information Request to the enrollee agent and the controller receiving a DPP Bootstrapping Information Response from the enrollee agent, wherein the enrollee agent is configured as a second BSS.

19 Claims, 9 Drawing Sheets

| FIELD | LENGTH | VALUE | DESCRIPTION |
|---|---|---|---|
| Type | 1 octet | 0xxx | DPP Bootstrapping URI Notification TLV |
| Length | 2 octets | Variable | Number of octets in ensuing field |
| Value | 6 octets | Variable | Radio Unique Identifier of a radio |
| | 6 octets | Variable | MAC Address of Local Interface (equal to BSSID) operating on the radio, on which the URI was received during PBC onboarding |
| | 6 octets | Variable | MAC Address of bSTA from which the URI was received during PBC onboarding |
| | N octets | Variable | DPP Bootstrapping URI received during PBC onboarding |

FIG. 4

METHOD AND APPARATUS FOR SECURING
A WI-FI LINK IN A WIRELESS
COMMUNICATION SYSTEM

CROSS-REFERENCE TO RELATED APPLICATIONS

This application is a utility application claiming priority to U.S. Provisional Application Ser. No. 62/836,539 filed on Apr. 19, 2019, entitled "METHOD AND APPARATUS FOR SECURING A WI-FI LINK IN A WIRELESS COMMUNICATION SYSTEM," the entirety of which is incorporated by reference herein.

FIELD

This disclosure relates generally to multiple Access Point (AP) communication systems and more specifically to providing a Push Button Configuration (PBC) method in a Multi-AP system to secure both a Wi-Fi link and an 1905 layer of an Open Systems Interconnection (OSI) model.

BACKGROUND

A communication system is comprised of interconnected devices. In one example, the devices are interconnected with an IEEE 802.11 wireless protocol. When a new device is added to the system, it must be authenticated and subsequently configured. Authentication requires the device to establish its identity with an AP device. Configuration of the new device is a precondition to permitting the new device to communicate with other devices in the system. The process of configuring a new device is referred to as device provisioning, which may be performed with a Device Provisioning Protocol (DPP).

Previously methods for configuring a new device have required manual entry of security credentials by a user. Subsequently, a PBC configuration method was defined for configuration of Multi-AP devices that conform to Release One (e.g., "R1") of the Wi-Fi Alliance (WFA) Multi-AP specification (e.g., as documented in Version 1.0). The PBC method is the default and mandatory way of securing the Wi-Fi link for Multi-AP R1 devices.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 is a Type-Length-Value (TLV) protocol for encoding an information element in accordance with an example embodiment of the present disclosure.

DETAILED DESCRIPTION

For Multi-AP devices that conform to Release Two (e.g., "R2") of the WFA Multi-AP specification (e.g., as document in Version 2.x), DPP is the enhanced method over PBC to establish security for both the Wi-Fi layer and the 1905 layer. See WFA Multi-AP Specification, Version 1.0, for details on Release One (e.g., "R1") devices, the disclosure of which is incorporated by reference herein. See WFA DPP Specification, Version 1.0, for details on the DPP protocol, the disclosure of which is incorporated by reference herein. However, it is still preferable that the PBC method is used between R2 devices to establish the 1905 layer security. Various embodiments described herein provide for establishing security for both the Wi-Fi layer and the 1905 layer using PBC with R2 devices (and subsequently defined releases) including DPP, without changing the existing onboarding protocol defined by the WFA Multi-AP specification, and specifically the messaging protocol for messages M1 through M8. See WFA Wi-Fi Simple Configuration (WSC) Technical Specification, Version 2.07, for details on the formatting of messages M1 through M8, the disclosure of which is incorporated by reference herein.

Figure 1:
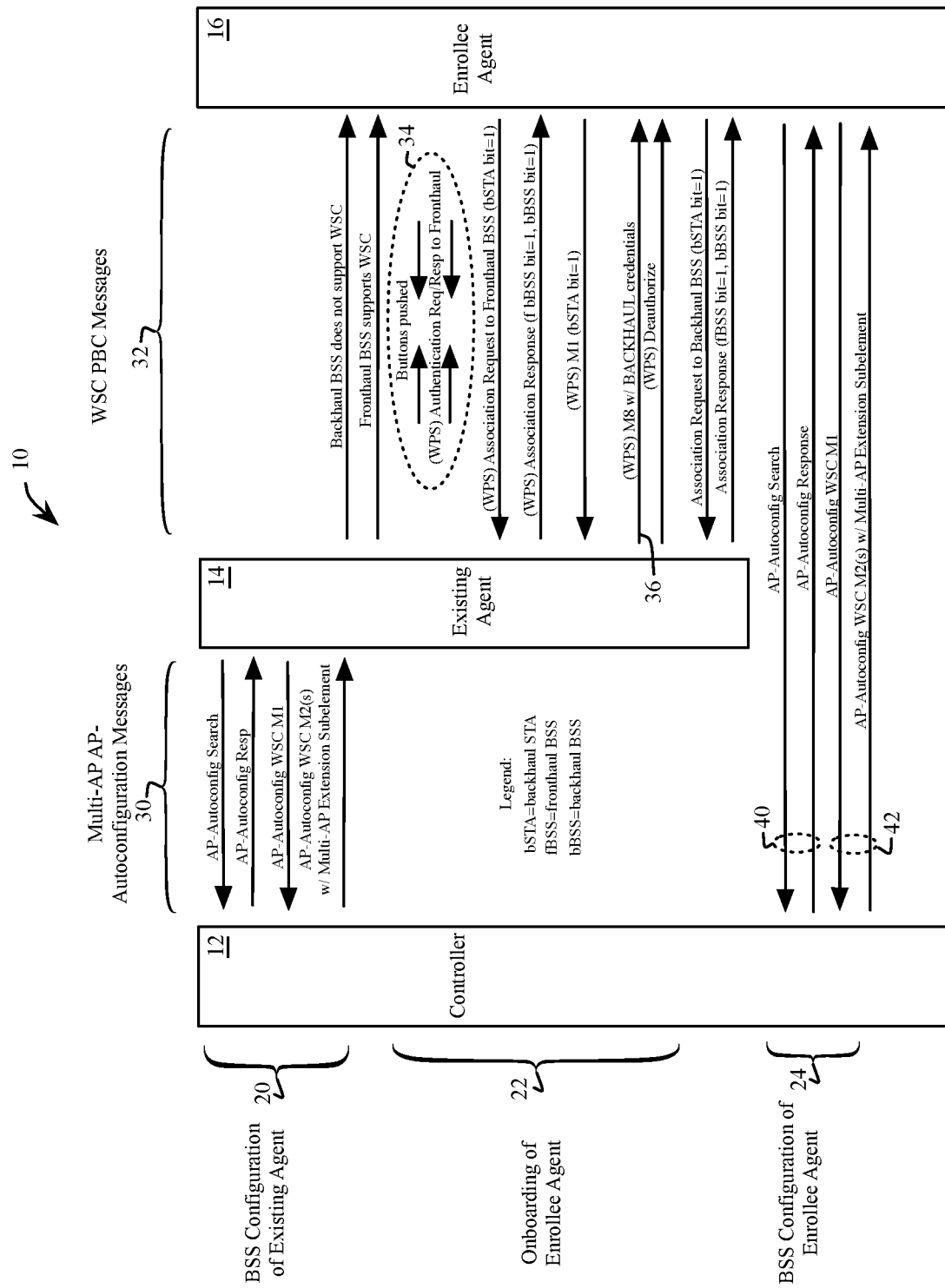
FIG. 1 is a schematic view of a Multi-AP system showing a conventional onboarding method in accordance with a WFA Multi-AP specification.

FIG. 1 shows a conventional onboarding method 10 of a Multi-AP communication system comprising a controller 12, an existing agent 14 and an enrollee agent 16. In one example embodiment, the existing agent 14 and the enrollee agent 16 are each AP agents. The method 10 conforms to the WFA Multi-AP specification, Version 1.0, wherein at least the enrollee agent is an R1 device. In the method 10, the controller 12 configures the existing agent 14 as a first Basic Service Set (BSS) with the communication shown in phase 20. The existing agent 14 onboards the enrollee agent in phase 22. The controller 12 configures the enrollee agent in phase 24. During the phase 20, Multi-AP AP-Autoconfiguration messages 30 are passed between the controller 12 and the existing agent 14. During phase 22, WSC PBC messages 32 are passed between the existing agent 14 and the enrollee agent 16. Specifically, PBC messages 34 for WPS authentication to Fronthaul are passed between the existing agent 14 and the enrollee agent 16. In addition, an M8 message with Backhaul credentials is passed from the existing agent 14 to the enrollee agent 16. During phase 24, AP-Autoconfiguration information 40 is exchanged between the controller 12 and the enrollee agent 16. During phase 24, AP-Autoconfiguration Wi-Fi Simple Configuration (WSC) information 42 is exchanged between the controller 12 and the enrollee agent 16.

Figure 2:
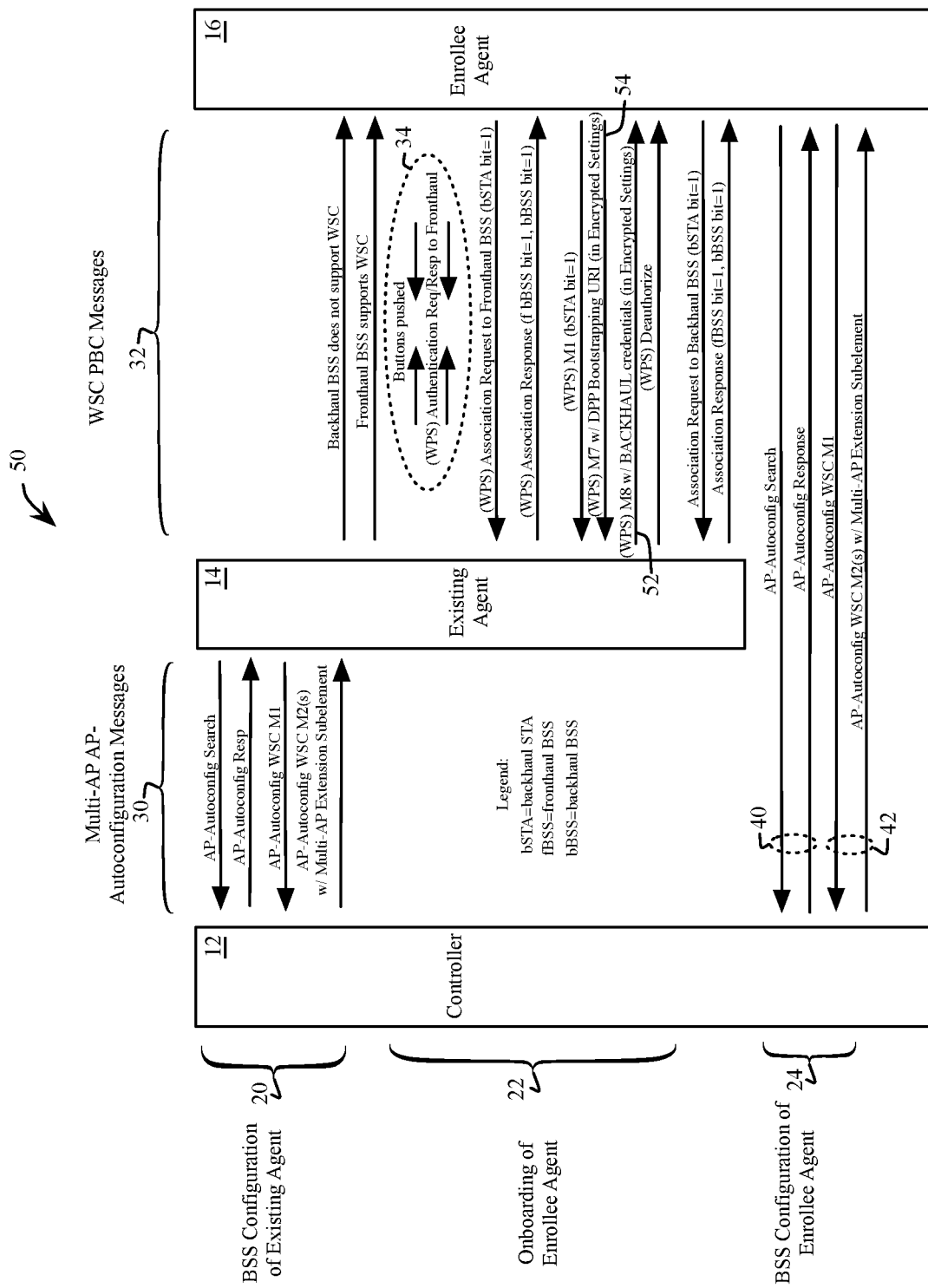
FIG. 2 is a schematic view of a Multi-AP communication system showing an onboarding method comprising a PBC method with an exchange of a DPP in accordance with an example embodiment of the present disclosure.

FIG. 2 shows an example embodiment of an onboarding method 50 of a Multi-AP communication system enhanced to establish security for both the Wi-Fi layer and the 1905 layer using the PBC method, wherein at least the enrollee agent 16 is an R2 device. The method 50 modifies the M8 message 36 of FIG. 1 to create a new WPS M8 52, wherein the backhaul credentials are included in the encrypted settings. The method 50 further modifies the method 10 of FIG. 1 by adding a WPS M7 54, wherein DPP Bootstrapping Uniform Resource Identifier (URI) is included in the encrypted settings.

In one example embodiment, the enrollee agent 16 (e.g., a Multi-AP R2 agent), performs the Multi-AP PBC onboarding procedure with the existing agent (e.g., a Multi-AP R2 agent), including the DPP Bootstrapping URI in the encrypted settings of M7. Additionally, the enrollee agent 16 receiving the DPP Bootstrapping URI from the existing agent 14 during the Multi-AP PBC onboarding procedure, sends a unicast DPP Bootstrapping URI Notification message to the controller 12, containing the DPP Bootstrapping URI, and then deletes the DPP Bootstrapping URI. This URI Notification message is encrypted (e.g., using R2-Unicast-Encryption). This URI Notification message is not broadcast and is only sent to the controller 12. While the method 50 provides for establishing security for both the Wi-Fi layer and the 1905 layer using the PBC method, it is not compatible with legacy devices due to the requirement to change the sequence and messaging of M1 through M8.

Figure 3:
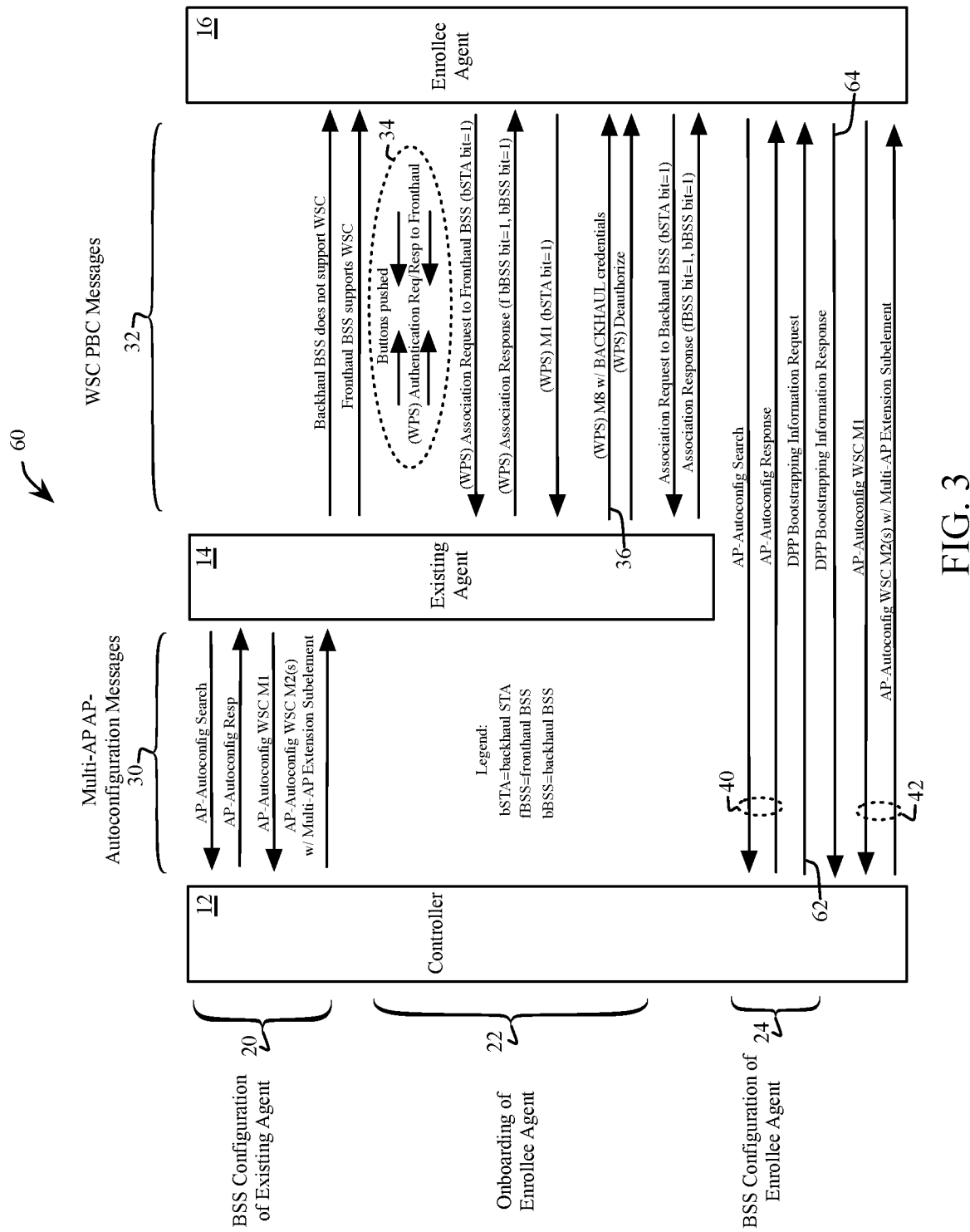
FIG. 3 is a schematic view of a Multi-AP communication system showing an onboarding method comprising a PBC method with an exchange of a DPP in accordance with another example embodiment of the present disclosure.

FIG. 3 shows another example embodiment of an onboarding method 60 of a Multi-AP communication system enhanced to establish security for both the Wi-Fi layer and the 1905 layer using the PBC method, wherein at least the enrollee agent 16 is an R2 device. In contrast to the method 50 of FIG. 2, the method 60 is compatible with legacy devices (e.g., a R1 device). It is envisioned that the teachings of this disclosure as applied to R2 devices are also applicable to subsequently defined releases of the WFA Multi-AP specification (e.g., being applicable to Release 3 or "R3" devices).

The method 60 modifies the method 10 by exchanging DPP Bootstrapping Information between the controller 12 and the enrollee agent 16 during the phase 24. Specifically, a DPP Bootstrapping Information Request 62 is transmitted from the controller 12 to the enrollee agent 16. Subsequently, a DPP Bootstrapping Information Response 64 is then received from the enrollee agent 16 by the controller 12. The DPP Bootstrapping Information Request 62 includes a TLV protocol for encoding an information element comprising a DPP Bootstrapping Information.

In one embodiment, prior to exchanging the AP Autoconfiguration WSC Information 42 and when the controller 12 determines that both the controller 12 and the enrollee agent 16 are R2 devices, the controller 12 transmits the DPP Bootstrapping Information Request 62 to the enrollee agent 16. The enrollee agent 16 responds by returning its Bootstrapping Information by transmitting the DPP Bootstrapping Information Response 64. In another embodiment, following the exchange of the AP Autoconfiguration WSC Information 42, the controller 12 transmits the DPP Bootstrapping Information Request 62 to the enrollee agent 16. The enrollee agent 16 responds by returning its Bootstrapping Information by transmitting the DPP Bootstrapping Information Response 64. FIG. 4 shows an example embodiment 70 of a TLV protocol for encoding an information element. In one embodiment, the information element encoded by the TLV protocol of embodiment 70 is transmitted in the DPP Bootstrapping Information Request 62 of FIG. 3. With reference to FIG. 4, the term MAC means "Medium Access Control," BBSID means "Basic Service Set Identifier," bSTA means "Backhaul Station," and URI means "Uniform Resource Identifier."

Figure 5:
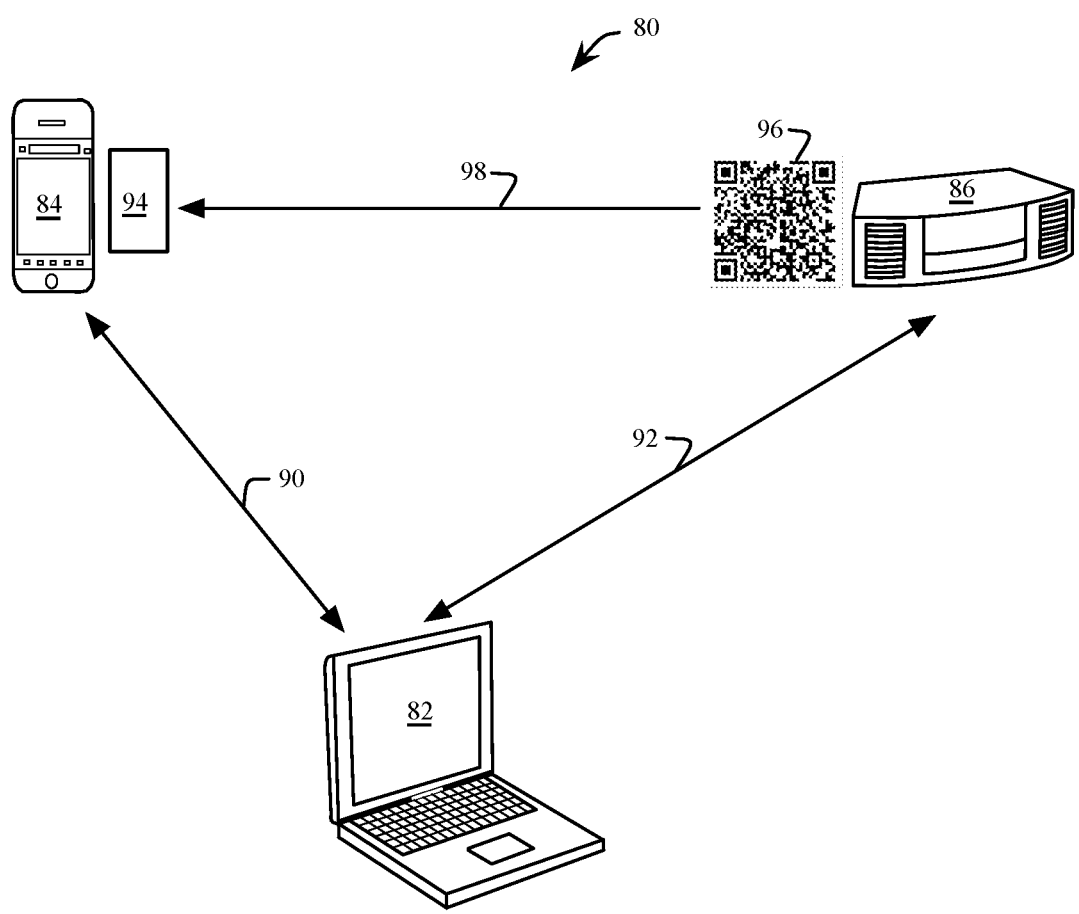
FIG. 5 is an example embodiment of the Multi-AP system of FIG. 3 using a Quick Response (QR) code for authenticating an enrollee device with an existing agent.
Figure 6:
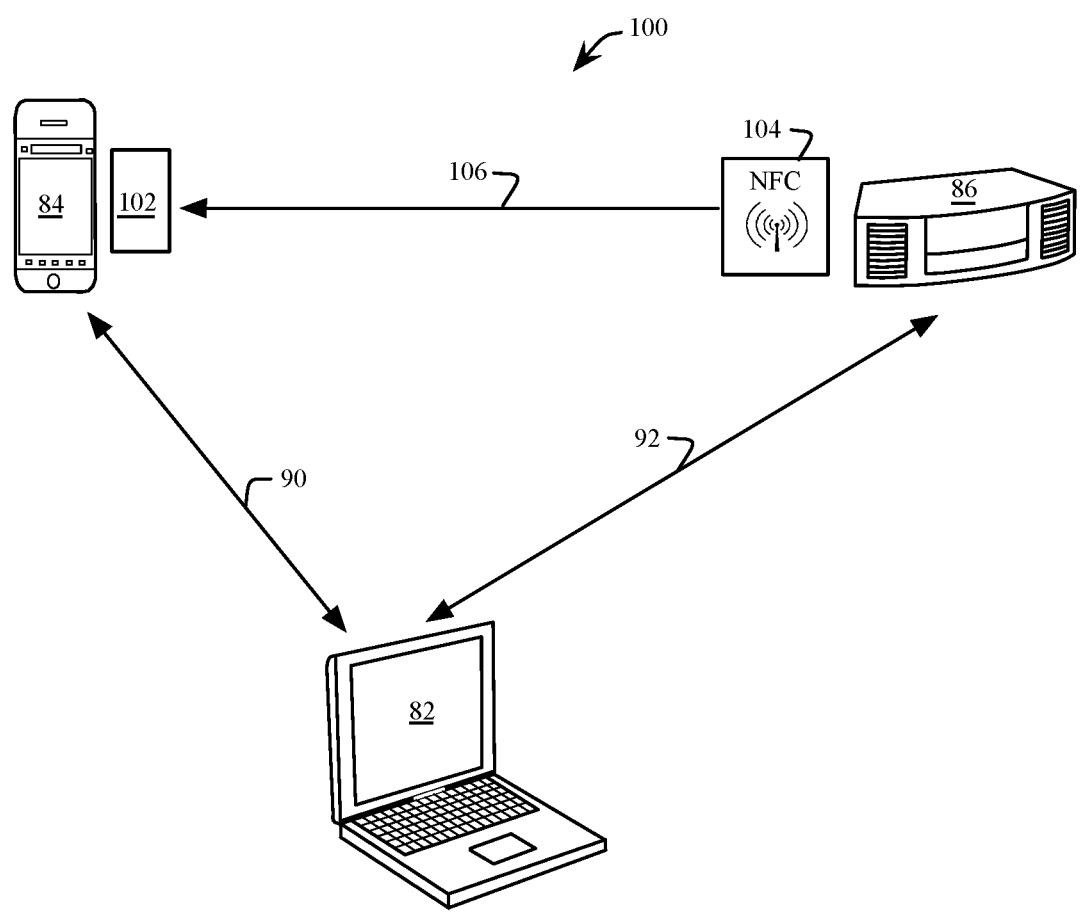
FIG. 6 is an example embodiment of the Multi-AP system of FIG. 3 using a Near Field Communication (NFC) for authenticating an enrollee device with an existing agent.
Figure 7:
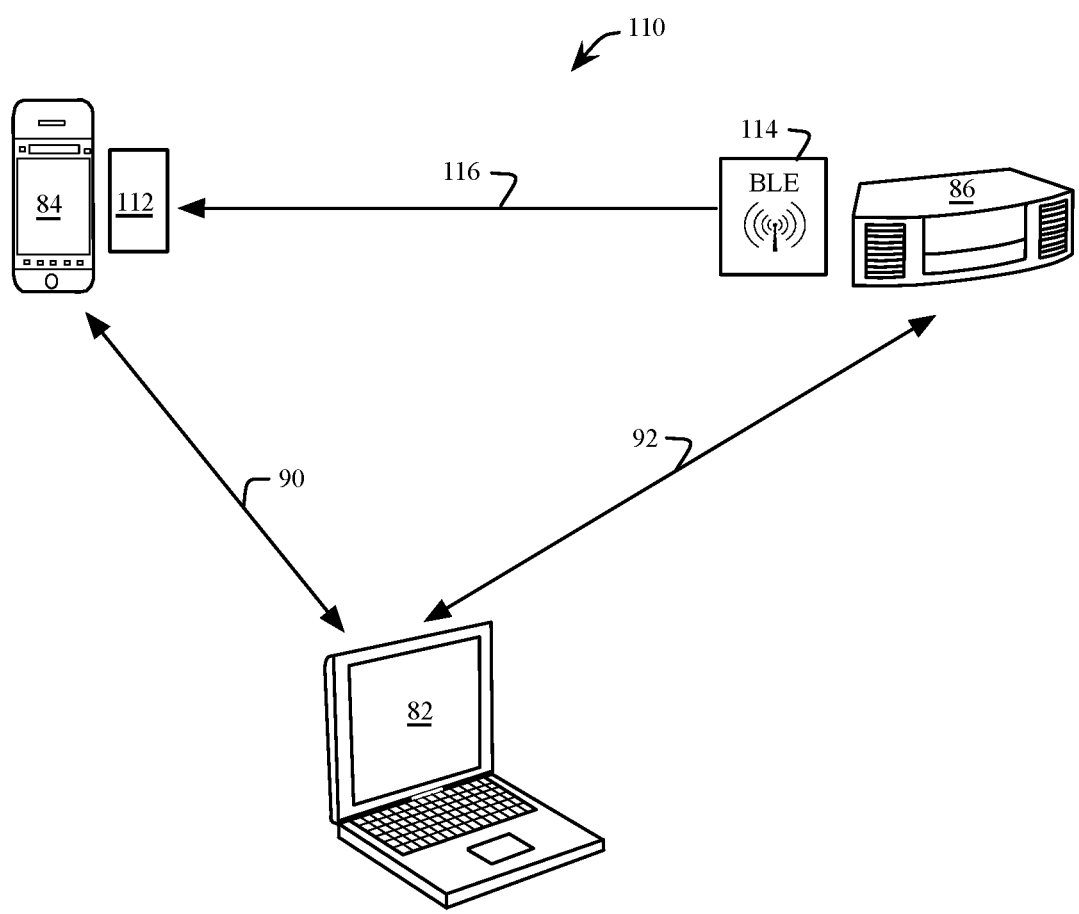
FIG. 7 is an example embodiment of the Multi-AP system of FIG. 3 using a Bluetooth transmission for authenticating an enrollee device with an existing agent.

FIG. 5, FIG. 6 and FIG. 7 show example embodiments of the Multi-AP communication system of FIG. 3 configured for authentication of new Multi-AP devices prior to BSS configuration of the same Multi-AP devices. Referring to FIG. 5 and FIG. 3, in one embodiment, a controller 82 is a laptop computer, an existing agent 84 is a cell phone and an enrollee agent 86 is an audio player. The various devices shown in FIG. 5 are shown for clarity of exposition and should not be construed as a limitation on the types of devices comprising the Multi-AP communication system of FIG. 3.

Referring to FIG. 5, the embodiment 80 includes a wireless communication path 90 between the controller 82 and the existing agent 84. The embodiment 80 includes a wireless communication path 92 between the controller 82 and the enrollee agent 86. The existing agent 84 authenticates the enrollee agent 86 by reading a QR code 96 over the path 98 from the enrollee agent 86, using a QR code reader 94 in communication with the existing agent 84. In one embodiment, the QR code reader 94 optically scans the QR code 96 as a machine-scannable image and maps the various black squares and/or dots of the QR code 96 to representative text. The QR code 96 further comprises three targets that the QR code reader 94 uses for scaling and rotational alignment with the QR code 96.

Referring to FIG. 6, the embodiment 100 includes the wireless communication path 90 between the controller 82 and the existing agent 84. The embodiment 100 includes the wireless communication path 92 between the controller 82 and the enrollee agent 86. The existing agent 84 authenticates the enrollee agent 86 by receiving a Near Field Communication (NFC) 104 transmission over the path 106 from the enrollee agent 86, using an NFC reader 102 in communication with the existing agent 84. The NFC reader 102 receives and decodes the NFC 104 transmission, when the existing agent 84 is physically close to the enrollee agent 86. In one embodiment, the NFC 104 transmission is a Radio Frequency (RF) transmission, forming a wireless link with the NFC reader 102.

Referring to FIG. 7, the embodiment 110 includes the wireless communication path 90 between the controller 82 and the existing agent 84. The embodiment 110 includes the wireless communication path 92 between the controller 82 and the enrollee agent 86. The existing agent 84 authenticates the enrollee agent 86 by receiving a transmission from a Bluetooth radio 114 over the path 116 from the enrollee agent 86, using a Bluetooth reader 112 in communication with the existing agent 84. In one example embodiment, the Bluetooth radio 114 uses the Bluetooth Low Energy (BLE) protocol. In another example embodiment, the Bluetooth radio 114 uses a Bluetooth Basic Rate/Enhanced Data Rate (BR/EDR or "Classic") protocol.

Figure 8:
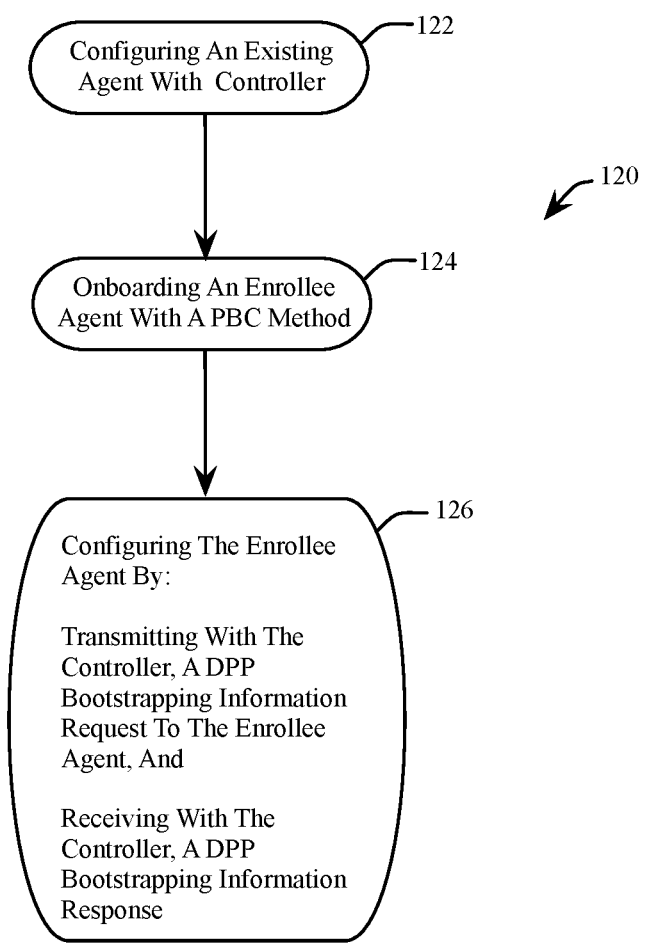
FIG. 8 is a flowchart representation of a method for securing a Wi-Fi link in a wireless communication system in accordance with an example embodiment of the present disclosure.

FIG. 8 shows an example embodiment 120 of a method for securing a Wi-Fi link in a wireless communication system. With reference to FIG. 8 and FIG. 3, at 122, an existing agent 14 is configured with a controller 12. At 124, an enrollee agent 16 is onboarded with a PBC method. At 126, the enrollee agent 16 is configured by transmitting with the controller 12, a DPP Bootstrapping Information Request 62 to the enrollee agent 16, and receiving with the controller 12, a DPP Bootstrapping Information Response 64.

Figure 9:
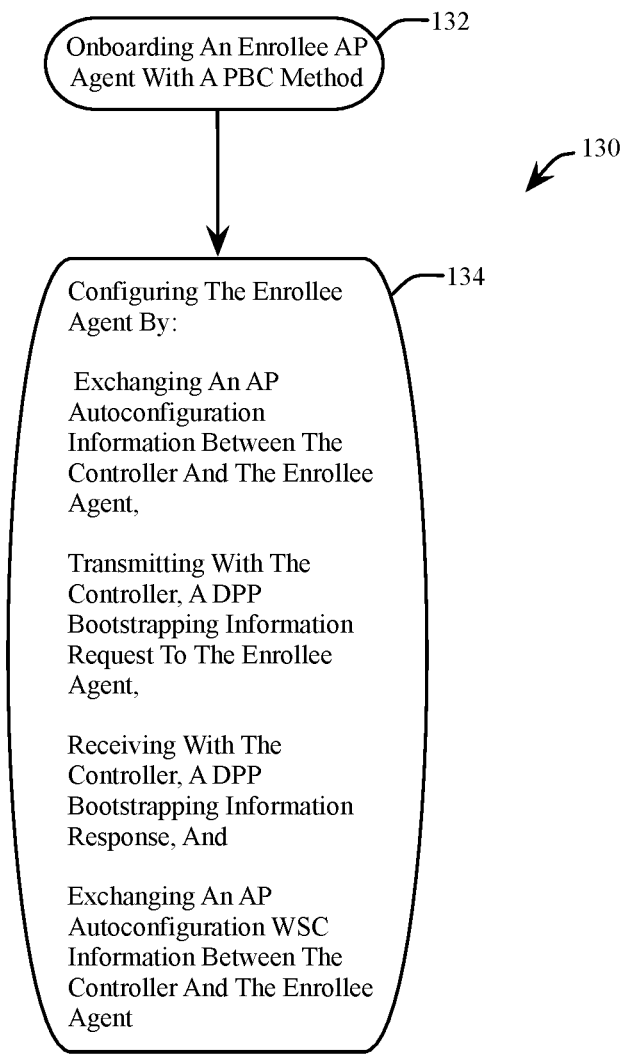
FIG. 9 is a flowchart representation of a method for securing a Wi-Fi link in a wireless communication system in accordance with an example embodiment of the present disclosure.

FIG. 9 shows an example embodiment 130 of a method for securing a Wi-Fi link in a wireless communication system. With reference to FIG. 9 and FIG. 3, at 132, an enrollee agent 16 is onboarded with a PBC method. At 134, the enrollee agent 16 is configured by exchanging an AP Autoconfiguration information 40 between the controller 12 and the enrollee agent 16; transmitting with the controller 12, a DPP Bootstrapping Information Request 62 to the enrollee agent 16; receiving with the controller 12, a DPP Bootstrapping Information Response 64; and exchanging an AP Autoconfiguration WSC information 42 between the controller 12 and the enrollee agent 16.

As will be appreciated, embodiments as disclosed include at least the following. In one embodiment, a method for securing a Wi-Fi link in a wireless communication system comprises configuring an existing agent with a controller, wherein the existing agent is configured as a first Basic Service Set (BSS). An enrollee agent is onboarded with a Push Button Configuration (PBC) method to establish an 1905 layer security between the existing agent and the enrollee agent. The enrollee agent is configured with the controller, comprising the controller transmitting a Device Provisioning Protocol (DPP) Bootstrapping Information Request to the enrollee agent and the controller receiving a DPP Bootstrapping Information Response from the enrollee agent, wherein the enrollee agent is configured as a second BSS.

Alternative embodiments of the method for securing a Wi-Fi link in a wireless communication system include one of the following features, or any combination thereof. An Access Point (AP) Autoconfiguration information is exchanged between the controller and the enrollee agent, and an Access Point (AP) Autoconfiguration Wi-Fi Simple Configuration (WSC) information is exchanged between the controller and the enrollee agent, after exchanging the AP Autoconfiguration information. The DPP Bootstrapping Information Request is transmitted before exchanging the AP Autoconfiguration WSC information. The DPP Bootstrapping Information Request is transmitted after exchanging the AP Autoconfiguration WSC information. The enrollee agent is authenticated by reading a Quick Response (QR) code of the enrollee agent with the existing agent. The enrollee agent is authenticated by reading a Near Field Communication (NFC) transmission of the enrollee agent with an NFC reader connected to the existing agent. The enrollee agent conforms to a Release 2 of the WiFi Alliance Multi-Access Point Specification. The DPP Bootstrapping Information Request is formed by encoding an information element with a Type-Length-Value (TLV) protocol, the information element comprising a DPP Bootstrapping Information.

In another embodiment, an apparatus comprises a controller, an existing Access Point (AP) agent, wherein the controller is configured to configure the existing AP agent as a first basic service set (BSS), and an enrollee AP agent configured to establish an 1905 layer security with the existing AP agent with a Push Button Configuration (PBC) method and the enrollee AP agent configured to be configured as a second BSS by the controller, wherein the controller is configured to transmit a Device Provisioning Protocol (DPP) Bootstrapping Information Request to the enrollee AP agent and the controller is configured to receive a DPP Bootstrapping Information Response from the enrollee AP agent.

Alternative embodiments of the apparatus include one of the following features, or any combination thereof. The enrollee agent is configured with an AP Autoconfiguration information exchanged between the controller and the enrollee agent, and an AP Autoconfiguration Wi-Fi Simple Configuration (WSC) information exchanged between the controller and the enrollee agent, after exchanging the AP Autoconfiguration information. The controller is configured to transmit the DPP bootstrapping Information Request before the AP Autoconfiguration WSC information is exchanged. The controller is configured to transmit the DPP bootstrapping Information Request after the AP Autoconfiguration WSC information is exchanged. The existing AP agent comprises a Quick Response (QR) code reader configured to read a QR code of the enrollee AP agent. The existing AP agent comprises a Near Field Communication (NFC) reader configured to read an NFC transmission of the enrollee AP agent. The existing AP agent comprises a Bluetooth reader configured to read a Bluetooth transmission of the enrollee AP agent. The DPP bootstrapping information request comprises an information element encoded with a Type-Length-Value (TLV) protocol, the information element comprising a DPP Bootstrapping Information.

In another embodiment, a method for securing a Wi-Fi link in a wireless communication system comprises onboarding an enrollee Access Point (AP) agent with a Push Button Configuration (PBC) method to establish an 1905 layer security between an existing AP agent and the enrollee AP agent. The enrollee AP agent is configured with a controller comprising: exchanging an AP Autoconfiguration information between the controller and the enrollee agent, transmitting with the controller, a Device Provisioning Protocol (DPP) Bootstrapping Information Request to the enrollee AP agent, receiving with the controller, a DPP Bootstrapping Information Response from the enrollee AP agent, and exchanging an AP Autoconfiguration Wi-Fi Simple Configuration (WSC) information between the controller and the enrollee agent, after exchanging the AP Autoconfiguration information.

Alternative embodiments of the method for securing a Wi-Fi link in a wireless communication system include one of the following features, or any combination thereof. The DPP Bootstrapping Information Request is transmitted before exchanging the AP Autoconfiguration WSC information. The DPP Bootstrapping Information Request is transmitted after exchanging the AP Autoconfiguration WSC information. The DPP Bootstrapping Information Request is formed by encoding an information element with a Type-Length-Value (TLV) protocol, the information element comprising a DPP Bootstrapping Information.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for securing a Wi-Fi link in a wireless communication system comprising:
    configuring an existing agent with a controller, wherein the existing agent is configured as a first Basic Service Set (BSS);
    onboarding an enrollee agent with a Push Button Configuration (PBC) method to establish an 1905 layer security between the existing agent and the enrollee agent; and
    configuring the enrollee agent with the controller, comprising the controller transmitting a Device Provisioning Protocol (DPP) Bootstrapping Information Request to the enrollee agent and the controller receiving a DPP Bootstrapping Information Response from the enrollee agent, wherein the enrollee agent is configured as a second BSS, and wherein the enrollee agent conforms to a Release 2 of the Wi-Fi Alliance Multi-Access Point Specification.

2. The method of claim 1 wherein configuring the enrollee agent further comprises:
    exchanging an Access Point (AP) Autoconfiguration information between the controller and the enrollee agent, and
    exchanging an Access Point (AP) Autoconfiguration WiFi Simple Configuration (WSC) information between the controller and the enrollee agent, after exchanging the AP Autoconfiguration information.

3. The method of claim 2 wherein the DPP Bootstrapping Information Request is transmitted before exchanging the AP Autoconfiguration WSC information.

4. The method of claim 2 wherein the DPP Bootstrapping Information Request is transmitted after exchanging the AP Autoconfiguration WSC information.

5. The method of claim 1 further comprising authenticating the enrollee agent by reading a Quick Response (QR) code of the enrollee agent with the existing agent.

6. The method of claim 1 further comprising authenticating the enrollee agent by reading a Near Field Communication (NFC) transmission of the enrollee agent with an NFC reader connected to the existing agent.

7. The method of claim 1 wherein the DPP Bootstrapping Information Request is formed by encoding an information element with a Type-Length-Value (TLV) protocol, the information element comprising a DPP Bootstrapping Information.

8. An apparatus comprising:
    a controller;
    an existing Access Point (AP) agent, wherein the controller is configured to configure the existing AP agent as a first basic service set (BSS); and
    an enrollee AP agent configured to establish an 1905 layer security with the existing AP agent with a Push Button Configuration (PBC) method and the enrollee AP agent configured to be configured as a second BSS by the controller, wherein the controller is configured to transmit a Device Provisioning Protocol (DPP) Bootstrapping Information Request to the enrollee AP agent and the controller is configured to receive a DPP Bootstrapping Information Response from the enrollee AP agent, and wherein the enrollee AP agent conforms to a Release 2 of the Wi-Fi Alliance Multi-Access Point Specification.

9. The apparatus of claim 8 wherein the enrollee AP agent is configured with:
    an AP Autoconfiguration information exchanged between the controller and the enrollee agent, and
    an AP Autoconfiguration Wi-Fi Simple Configuration (WSC) information exchanged between the controller and the enrollee agent, after exchanging the AP Autoconfiguration information.

10. The apparatus of claim 9 wherein the controller is configured to transmit the DPP bootstrapping Information Request before the AP Autoconfiguration WSC information is exchanged.

11. The apparatus of claim 9 wherein the controller is configured to transmit the DPP bootstrapping Information Request after the AP Autoconfiguration WSC information is exchanged.

12. The apparatus of claim 8 wherein the existing AP agent comprises a Quick Response (QR) code reader configured to read a QR code of the enrollee AP agent.

13. The apparatus of claim 8 wherein the existing AP agent comprises a Near Field Communication (NFC) reader configured to read an NFC transmission of the enrollee AP agent.

14. The apparatus of claim 8 wherein the existing AP agent comprises a Bluetooth reader configured to read a Bluetooth transmission of the enrollee AP agent.

15. The apparatus of claim 8 wherein the DPP bootstrapping information request comprises an information element encoded with a Type-Length-Value (TLV) protocol, the information element comprising a DPP Bootstrapping Information.

16. A method for securing a Wi-Fi link in a wireless communication system comprising:
    onboarding an enrollee Access Point (AP) agent with a Push Button Configuration (PBC) method to establish an 1905 layer security between an existing AP agent and the enrollee AP agent, wherein the enrollee AP agent conforms to a Release 2 of the Wi-Fi Alliance Multi-Access Point Specification; and
    configuring the enrollee AP agent with a controller comprising:
    exchanging an AP Autoconfiguration information between the controller and the enrollee agent,
    transmitting with the controller, a Device Provisioning Protocol (DPP) Bootstrapping Information Request to the enrollee AP agent,
    receiving with the controller, a DPP Bootstrapping Information Response from the enrollee AP agent, and
    exchanging an AP Autoconfiguration Wi-Fi Simple Configuration (WSC) information between the controller and the enrollee agent, after exchanging the AP Autoconfiguration information.

17. The method of claim 16 wherein the DPP Bootstrapping Information Request is transmitted before exchanging the AP Autoconfiguration WSC information.

18. The method of claim 16 wherein the DPP Bootstrapping Information Request is transmitted after exchanging the AP Autoconfiguration WSC information.

19. The method of claim 16 wherein the DPP Bootstrapping Information Request is formed by encoding an information element with a Type-Length-Value (TLV) protocol, the information element comprising a DPP Bootstrapping Information.

* * * * *